(12) United States Patent
Uemura

(10) Patent No.: US 8,131,508 B2
(45) Date of Patent: *Mar. 6, 2012

(54) SENSOR APPARATUS

(75) Inventor: Takeshi Uemura, Osaka (JP)

(73) Assignee: Panasonic Corporation, Osaka (JP)

( * ) Notice: Subject to any disclaimer, the term of this patent is extended or adjusted under 35 U.S.C. 154(b) by 16 days.

This patent is subject to a terminal disclaimer.

(21) Appl. No.: 12/832,326

(22) Filed: Jul. 8, 2010

(65) Prior Publication Data

US 2010/0271042 A1 Oct. 28, 2010

Related U.S. Application Data

(63) Continuation-in-part of application No. 12/693,583, filed on Jan. 26, 2010.

(30) Foreign Application Priority Data

Feb. 5, 2009 (JP) .................................. 2009-024664

(51) Int. Cl.
*G06F 11/30* (2006.01)

(52) U.S. Cl. ............................. 702/183; 702/34; 702/58

(58) Field of Classification Search .................... 702/34, 702/35, 58, 59, 182, 183, 185
See application file for complete search history.

(56) References Cited

U.S. PATENT DOCUMENTS

| | | | | |
|---|---|---|---|---|
| 3,964,016 A | * | 6/1976 | Yamada et al. | 180/274 |
| 4,337,516 A | * | 6/1982 | Murphy et al. | 702/183 |
| 4,376,298 A | * | 3/1983 | Sokol et al. | 701/34 |
| 4,402,054 A | * | 8/1983 | Osborne et al. | 702/185 |
| 5,212,640 A | * | 5/1993 | Matsuda | 701/34 |
| 5,408,412 A | * | 4/1995 | Hogg et al. | 701/33 |
| 7,233,847 B2 | | 6/2007 | Otsuka | |
| 7,730,782 B2 | | 6/2010 | Uemura | |
| 2005/0216149 A1 | | 9/2005 | Kato | |
| 2006/0222291 A1 | | 10/2006 | Yoshida | |
| 2007/0216399 A1 | | 9/2007 | Reusing | |

(Continued)

FOREIGN PATENT DOCUMENTS

DE 10 2006 023 213 B3 9/2007

(Continued)

OTHER PUBLICATIONS

European Search Report for Appl. No. EP 10151727 dated Apr. 27, 2010.

(Continued)

*Primary Examiner* — Jeffrey R West
(74) *Attorney, Agent, or Firm* — Pearne & Gordon LLP

(57) ABSTRACT

A sensor apparatus of the present invention includes a failure diagnosis circuit, and a time point measuring unit for adding the time point information to an output concerning generation of the failure detection signal outputted from the failure diagnosis object section and an output concerning generation of the sense signal such that the output concerning generation of the failure detection signal is made to correspond to the output concerning generation of the sense signal using time point information in terms of time points. In the case of the failure diagnosis circuit determining abnormality of the failure diagnosis object section, the first output terminal outputs the sense signal added with the time point information at the time of occurrence of the abnormality and the sense signal added with the time point information after the time of occurrence of the abnormality, as a signal outside a range of a normal output voltage.

4 Claims, 4 Drawing Sheets

U.S. PATENT DOCUMENTS

| | | |
|---|---|---|
| 2009/0007663 A1 | 1/2009 | Uemura |
| 2009/0128160 A1* | 5/2009 | Chiaburu et al. ............ 324/537 |
| 2009/0138118 A1 | 5/2009 | Inokawa et al. |
| 2009/0210186 A1 | 8/2009 | Siess |
| 2009/0229134 A1 | 9/2009 | Nagase |
| 2010/0097088 A1 | 4/2010 | Uemura |
| 2010/0194401 A1 | 8/2010 | Uemura |
| 2010/0198557 A1 | 8/2010 | Uemura |

FOREIGN PATENT DOCUMENTS

| | | |
|---|---|---|
| DE | 102006012074 A1 | 9/2007 |
| DE | 102006023213 B3 | 9/2007 |
| EP | 1 854 645 A1 | 11/2007 |
| JP | 59-113893 A | 6/1984 |
| JP | 4-161822 A | 6/1992 |
| JP | 06-045969 A | 2/1994 |
| JP | 08-327363 A | 12/1996 |
| JP | 09-079809 A | 3/1997 |
| JP | 2001-074503 A | 3/2001 |
| JP | 2003-252027 A | 9/2003 |
| JP | 2004-264074 A | 9/2004 |
| JP | 2004-301512 A | 10/2004 |
| JP | 2005-147915 A | 6/2005 |
| JP | 2005-283481 A | 10/2005 |
| JP | 2005-331332 A | 12/2005 |
| JP | 2007-305632 A | 11/2007 |
| JP | 2008-002890 A | 1/2008 |
| JP | 4245081 B1 | 1/2009 |
| JP | 4289439 B1 | 4/2009 |
| JP | 4311496 B1 | 5/2009 |
| JP | 4337952 B1 | 7/2009 |
| JP | 4358301 B1 | 8/2009 |
| JP | 4386143 B1 | 10/2009 |
| WO | 96/10807 A1 | 4/1996 |

OTHER PUBLICATIONS

Chinese Office action for CN 201010105690.9 dated Jun. 22, 2011.

* cited by examiner

FIG. 2

| $t_{01}$ | $r_{011}$ | $r_{012}$ | - - - | $r_{016}$ | $r_{017}$ | $r_{018}$ |
| $t_{02}$ | $r_{021}$ | $r_{022}$ | - - - | $r_{026}$ | $r_{027}$ | $r_{028}$ |
| $t_{03}$ | $r_{031}$ | $r_{032}$ | - - - | $r_{036}$ | $r_{037}$ | $r_{038}$ |
| $t_{04}$ | $r_{041}$ | $r_{042}$ | - - - | $r_{046}$ | $r_{047}$ | $r_{048}$ |
| $t_{96}$ | $r_{961}$ | $r_{962}$ | - - - | $r_{966}$ | $r_{967}$ | $r_{968}$ |
| $t_{97}$ | $r_{971}$ | $r_{972}$ | - - - | $r_{976}$ | $r_{977}$ | $r_{978}$ |
| $t_{98}$ | $r_{981}$ | $r_{982}$ | - - - | $r_{986}$ | $r_{987}$ | $r_{988}$ |
| $t_{99}$ | $r_{991}$ | $r_{992}$ | - - - | $r_{996}$ | $r_{997}$ | $r_{998}$ |

FIG. 3

| $t_{01}$ | $f_{011}$ | $f_{012}$ | - - - | $f_{016}$ | $f_{017}$ | $f_{018}$ |
| $t_{02}$ | $f_{021}$ | $f_{022}$ | - - - | $f_{026}$ | $f_{027}$ | $f_{028}$ |
| $t_{03}$ | $f_{031}$ | $f_{032}$ | - - - | $f_{036}$ | $f_{037}$ | $f_{038}$ |
| $t_{04}$ | $f_{041}$ | $f_{042}$ | - - - | $f_{046}$ | $f_{047}$ | $f_{048}$ |
| $t_{96}$ | $f_{961}$ | $f_{962}$ | - - - | $f_{966}$ | $f_{967}$ | $f_{968}$ |
| $t_{97}$ | $f_{971}$ | $f_{972}$ | - - - | $f_{976}$ | $f_{977}$ | $f_{978}$ |
| $t_{98}$ | $f_{981}$ | $f_{982}$ | - - - | $f_{986}$ | $f_{987}$ | $f_{988}$ |
| $t_{99}$ | $f_{991}$ | $f_{992}$ | - - - | $f_{996}$ | $f_{997}$ | $f_{998}$ |

SENSOR APPARATUS

FIELD OF THE INVENTION

The present invention relates to a sensor apparatus for use in automobiles, aircraft, vessels, robots, a variety of other electronic devices, and the like.

BACKGROUND OF THE INVENTION

A conventional sensor apparatus of this kind is described with reference to a drawing. FIG. 5 is an electric circuit diagram showing the conventional sensor apparatus.

As shown in FIG. 5, the sensor apparatus includes: drive circuit sections 1A, 1B for outputting drive signals that drive detection device 2; and detection circuit sections 3A, 3B for fetching response signals from detection device 2 and outputting the response signals. The sensor apparatus further includes: processing circuit sections 4A, 4B for fetching sensor signals from the response signals and outputting the sense signals from first output terminals 5A, 5B; and failure diagnosis circuit 6 for outputting a failure detection signal from second output terminal 7.

At least any one of drive circuit sections 1A, 1B, detection device 2, detection circuit sections 3A, 3B and processing circuit sections 4A, 4B is set as an object of failure diagnosis and referred to as a failure diagnosis object section. Failure diagnosis circuit 6 determines whether the failure diagnosis object section is normal or abnormal, and outputs a failure detection signal from second output terminal 7 in the case of determining abnormality.

As related art document information concerning this application, for example, Unexamined Japanese Patent Publication No. 2004-301512 (Patent Document 1) is known. Such a conventional sensor apparatus has had a problem with improvement in reliability under abnormality occurrence condition.

Specifically, in the above conventional configuration, even though abnormality of the failure diagnosis object section has been confirmed by failure diagnosis circuit 6, outputting of the failure detection signal from second output terminal 7 is delayed due to some kind of defect, and hence a sense signal determined as one under abnormal condition may be used for control of a controlled object such as an automobile. Further, on controlled object side such as an automobile, the sense signal determined as one under abnormal condition may be erroneously used for control of the controlled object due to some kind of defect, thereby causing a problem with improvement in reliability.

SUMMARY OF THE INVENTION

A sensor apparatus of the present invention includes a time point measuring unit for measuring time point information and adding the time point information to an output concerning generation of the failure detection signal outputted from the failure diagnosis object section and an output concerning generation of the sense signal. In the case of the failure diagnosis circuit determining abnormality of the failure diagnosis object section, the first output terminal outputs the sense signal added with the time point information at the time of occurrence of the abnormality and the sense signal added with the time point information after the time of occurrence of the abnormality, as a signal outside a range of a normal output voltage.

Alternatively, the sensor apparatus of the present invention includes an output circuit section for outputting a sense signal from a processing circuit section and a failure detection signal from a failure diagnosis circuit by the time division system. In the case of the failure diagnosis circuit determining abnormality of the failure diagnosis object section, the output circuit section outputs the sense signal added with the time point information at the time of occurrence of the abnormality and the sense signal added with the time point information after the time of occurrence of the abnormality, as a signal outside a range of a normal output voltage.

With this configuration, it is not necessary for a controlled object such as an automobile to determine whether a sense signal outputted from the sensor apparatus is one during normal condition or during abnormal condition, which can further reduce the possibility to use a sense signal from the sensor apparatus that has been determined as abnormal condition at least once on the controlled object side, thereby to seek further improvement in reliability from the time of occurrence of abnormality and continuously thereafter.

BRIEF DESCRIPTION OF THE DRAWINGS

FIG. 2 is a diagram showing a response signal added with time point information of the sensor apparatus according to the first embodiment of the present invention;

FIG. 3 is a diagram showing a failure detection signal added with time point information of the sensor apparatus according to the first embodiment of the present invention;

DESCRIPTION OF THE EXEMPLARY EMBODIMENT

First Exemplary Embodiment

Figure 1:
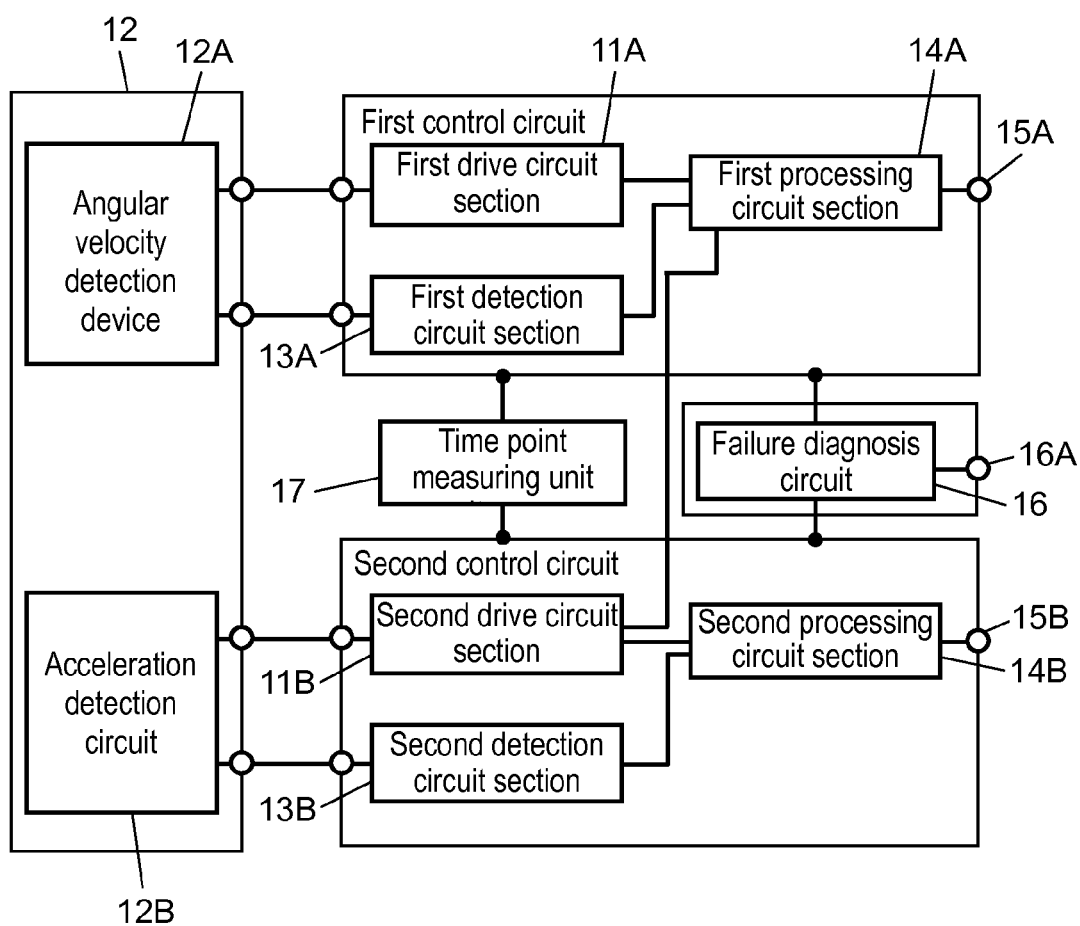
FIG. 1 is an electric circuit diagram showing a sensor apparatus according to a first embodiment of the present invention.

A description will be given below of a sensor apparatus according to a first embodiment of the present invention with reference to the drawings. FIG. 1 is an electric circuit diagram showing a sensor apparatus according to the first embodiment of the present invention.

As shown in FIG. 1, the sensor apparatus according to the first embodiment includes: first and second drive circuit sections 11A, 11B for outputting drive signals; angular velocity detection device 12A and acceleration detection circuit 12B as detection device 12, into which drive signals from drive circuit sections 11A, 11B are inputted; and first and second detection circuit sections 13A, 13B for fetching response signals from detection device 12 and outputting the response signals. The sensor apparatus further includes: first and second processing circuit sections 14A, 14B for fetching sense signals from the response signals and outputting the sense signals from first output terminals 15A, 15B; and failure diagnosis circuit 16 for outputting failure detection signals from second output terminal 16A. At least any one of drive circuit sections 11A, 11B, detection device 12, detection circuit sections 13A, 13B, and processing circuit sections 14A, 14B is set as a failure diagnosis object section, and failure diagnosis circuit 16 determines whether the failure diagnosis object section is normal or abnormal, and outputs a failure detection signal from second output terminal 16A in the case of determining abnormality.

When failure diagnosis circuit 16 determines abnormality of the failure diagnosis object section, a signal outside a range of a normal output voltage is outputted from each of first output terminals 15A, 15B.

Specifically, when failure diagnosis circuit 16 determines abnormality of the failure diagnosis object sections, failure diagnosis circuit 16 transmits that information to first and second processing circuit sections 14A, 14B. First and second processing circuit sections 14A, 14B having received transmission of the information output values to be outputted from first output terminals 15A, 15B as values outside the range of the normal output voltage. The information transmitted by failure diagnosis circuit 16 to each of first and second processing circuit sections 14A, 14B is hereinafter referred to as an "abnormal voltage value output order signal".

With reference to the foregoing "normal output voltage range", for example, it means a range of ±1.8V from a 0-point voltage when sensitivity is 6 mV/deg/s and a dynamic range is ±300 deg/s. In other words, when the 0-point voltage is 2.5 V±0.15 V, the normal output voltage range is from 1.55 to 4.45 V.

With such a configuration, it is not necessary for the controlled object such as an automobile to specifically determine whether sense signals outputted from first output terminals 15A, 15B are those during normal condition or during abnormal condition. This can further reduce the possibility to erroneously use a sense signal under abnormal condition on the controlled object side, thus leading to further improvement in reliability.

Further, as shown in FIG. 1, it is configured such that the sensor apparatus is provided with time point measuring unit 17 for measuring time point information and for adding the time point information to outputs from the failure diagnosis object sections, and the failure detection signals and the sense signals are made to correspond to each other by means of the time point information, thereby allowing further improvement in reliability to be sought.

As a specific example, the case of setting first and second detection circuit sections 13A, 13B as the failure diagnosis object sections is described. First, time point measuring unit 17 is electrically connected to first and second detection circuit sections 13A, 13B, while transmitting measured time point information. FIG. 2 is a diagram showing a response signal added with time point information of the sensor apparatus according to the first embodiment of the present invention. FIG. 3 is a diagram showing a failure detection signal added with time point information of the sensor apparatus according to the first embodiment of the present invention.

As shown in FIG. 2, when response signals (r011 to r998) are outputted from first and second detection circuit sections 13A, 13B, time point information (t01 to t99) are added thereto. The response signals (r011 to r998) added with the time point information (t01 to t99) are in the state of being added with the time point information (t01 to t99) also when outputted as sense signals from first output terminals 15A, 15B through first and second processing circuit sections 14A, 14B shown in FIG. 1. Meanwhile, failure diagnosis circuit 16 determines whether first and second detection circuit sections 13A, 13B as the failure diagnosis object sections are normal or abnormal, and outputs failure detection signals based upon a result of the determination. When first and second detection circuit sections 13A, 13B output information on failure detection toward failure diagnosis circuit 16, as shown in FIG. 3, time point information (t01 to t99) identical to that of the response signal (r011 to r998) is added. The failure detection signal (f011 to f998) is generated from information on failure detection in failure diagnosis circuit 16, and it is in the state of being added with the time point information (t01 to t99) also when outputted.

With such a configuration, the failure detection signals (f011 to f998) and the sense signals can be made to correspond to each other in terms of time points by means of the time point information (t01 to t99). Thus, when failure diagnosis circuit 16 determines abnormality at time point t04 shown in FIG. 3, the sense signal added with the time point information at time point t04 and made to correspond to the failure detection signal (f041 to f048) added with the time point information at time point t04 at which the abnormality occurs in terms of time points and the sense signal added with the time point information after time point t05 subsequent to time point t04 at which the abnormality occurs can be more accurately outputted as a signal of a value outside the normal output voltage range, thereby to seek further improvement in reliability from the time of occurrence of abnormality and continuously thereafter.

Furthermore, first output terminals 15A, 15B shown in FIG. 1 output the sense signal added with the time point information by time point measuring unit 17, after failure diagnosis circuit 16 outputs the failure detection signal added with the time point information at the same time point as the relevant time point information. The reliability thus improves. This will be specifically described below.

First, the output information of failure diagnosis circuit 16 is fed back to first and second processing circuit sections 14A, 14B. First and second processing circuit sections 14A, 14B then recognize that failure diagnosis circuit 16 has outputted the failure detection signals (f11 to f18) at time point t01 shown in FIG. 3, from the feedback. First output terminals 15A, 15B then output the sense signal at time point t01 shown in FIG. 2. With such a configuration, before the sense signal under abnormal condition is outputted from first output terminals 15A, 15B, failure diagnosis circuit 16 can output the failure detection signal which is made to correspond to the sense signal using the time point information and which indicates that the sense signal is one during abnormal condition, from second output terminal 16A. With the correspondence of the time point information, the failure detection signal can be reliably outputted before the sense signal even if some kind of delay occurs at one part of the circuit through which the failure detection signals (f11 to f18) pass. The sense signal under abnormal condition thus can be prevented from being used to control automobiles, and the like. The reliability further improves as a result.

In the first embodiment, the description is given using the two devices, angular velocity detection device 12A and acceleration detection device 12B, as detection device 12 and also using, as the circuit configuration corresponding thereto, the configuration having first and second drive circuit sections 11A, 11B, first and second detection circuit sections 13A, 13B, and first and second processing circuit sections 14A, 14B. However, it may be configured such that one detection device 12 is provided and as a circuit configuration corresponding thereto and only each one drive circuit section, detection circuit section, and processing circuit section is provided.

Although detection device 12 is the constitutional requirement of the sensor apparatus in the first embodiment, the present invention can also be configured even with detection device 12 provided outside the sensor apparatus. Specifically, the sensor apparatus of the present invention can be configured by including a drive circuit section, a detection circuit section, a processing circuit section, a failure diagnosis circuit, and a time point measuring unit, which exchange signals with detection device 12 provided outside the sensor apparatus.

In the first embodiment 1, the example is described where first and second detection circuit sections 13A, 13B are set as the failure diagnosis object sections and the identical portions respectively in the angular velocity detection system and the acceleration detection system are set as the failure diagnosis object sections. However, it may be configured such that non-identical portions respectively in the angular velocity detection system and the acceleration detection system are set as the two failure diagnosis object sections, as in a case where first detection circuit section 13A is set as the first failure diagnosis object section and second processing circuit section 14B is set as the second failure diagnosis object section. In that case, it is necessary to add common first time point information to both information on a sense signal from first detection circuit section 13A and information on failure detection outputted by first detection circuit section 13A toward failure diagnosis circuit 16, while it is necessary to add second common second time point information to both information on a sense signal from second processing circuit section 14B and information on failure detection outputted by second processing circuit section 14B toward failure diagnosis circuit 16.

Further, although one portion is set as the failure diagnosis object section in each of the angular velocity detection system and the acceleration detection system in the first embodiment, it may be configured such that failure diagnosis circuit 16 has a plurality of failure diagnosis object sections. Specifically, for example, failure diagnosis circuit 16 is electrically connected to each of first and second detection circuit sections 13A, 13B and first and second processing circuit sections 14A, 14B, and outputs failure detection signals of the respective sections. With such a configuration, a failure having been undetectable by one failure diagnosis object section can be detected by the plurality of failure diagnosis object sections performing failure diagnoses, so as to improve the accuracy of failure detection.

Although the description is given using angular velocity detection device 12A, acceleration detection device 12B and the like in the first embodiment, other than those, a variety of sensor apparatus such as a pressure sensor can also implement the present invention.

Second Exemplary Embodiment

A sensor apparatus according to a second embodiment of the present invention is described below with reference to a drawing. It is to be noted that elements having similar configurations to those in the first embodiment are provided with the same numerals as in the first embodiment, descriptions thereof are not given, and only differences from the first embodiment are detailed.

Figure 4:
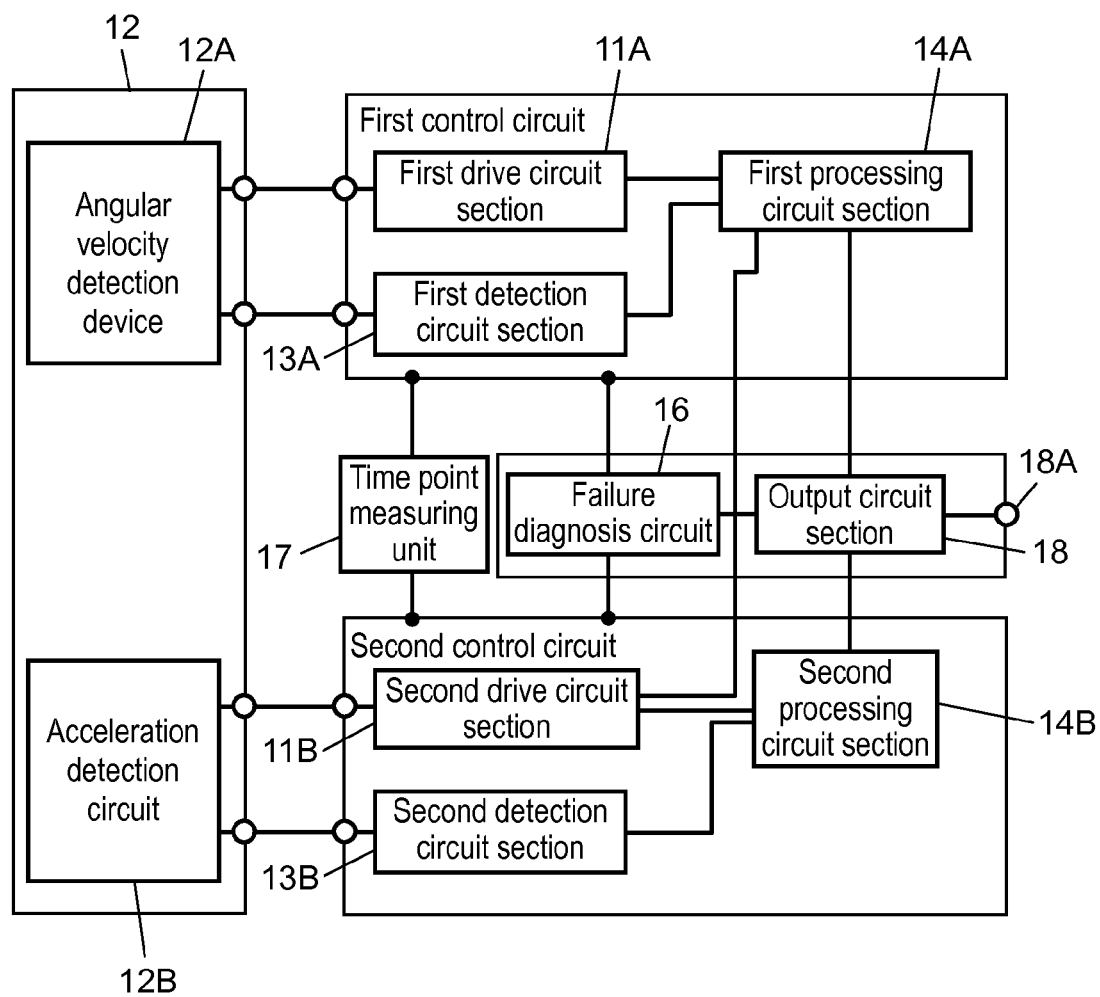
FIG. 4 is an electric circuit diagram showing a sensor apparatus according to a second embodiment of the present invention.
Figure 5:
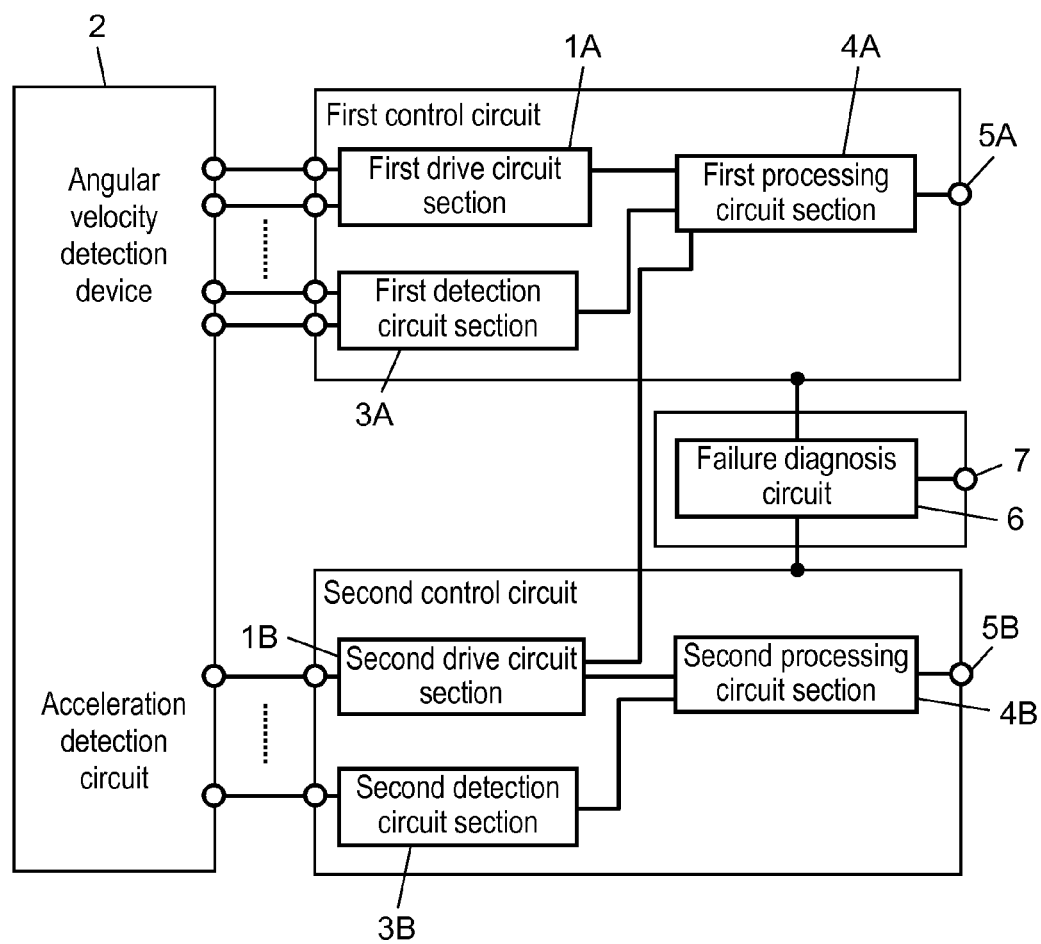
FIG. 5 is an electric circuit diagram showing a conventional sensor apparatus.

FIG. 4 is an electric circuit diagram showing a sensor apparatus according to the second embodiment of the present invention. As shown in FIG. 4, the sensor apparatus in the present embodiment includes: drive circuit sections 11A, 11B for outputting drive signals; angular velocity detection device 12A and acceleration detection circuit 12B as detection device 12, into which drive signals from drive circuit sections 11A, 11B are inputted; and detection circuit sections 13A, 13B for fetching response signals from detection device 12 and outputting the response signals. The sensor apparatus further includes: processing circuit sections 14A, 14B for fetching sense signals from response signals and outputting the sense signals; failure diagnosis circuit 16 for outputting failure detection signals; and output circuit section 18 for outputting the sense signals from processing circuit sections 14A, 14B and the failure detection signals from failure diagnosis circuit 16 from output terminal 18A by the time division system. At least any one of drive circuit sections 11A, 11B, detection device 12, detection circuit sections 13A, 13B, and processing circuit sections 14A, 14B is set as a failure diagnosis object section, and failure diagnosis circuit 16 determines whether the failure diagnosis object section is normal or abnormal, and outputs a failure detection signal in the case of determining abnormality.

It is configured such that, when failure diagnosis circuit 16 determines abnormality of the failure diagnosis object section, output circuit section 18 outputs as an output of the sense signal a signal outside a range of a normal output voltage.

Specifically, when failure diagnosis circuit 16 determines abnormality of the failure diagnosis object sections, failure diagnosis circuit 16 transmits that information to output circuit section 18, for example, and output circuit section 18 having received transmission of the information outputs a value to be outputted from output terminal 18A as a value outside the range of the normal output voltage. The signal transmitted by failure diagnosis circuit 16 to output circuit section 18 is hereinafter referred to as an "abnormal voltage value output order signal".

With reference to the foregoing "normal output voltage range", for example, it means a range of ±1.8V from a 0-point voltage when sensitivity is 6 mV/deg/s and a dynamic range is ±300 deg/s. In other words, when the 0-point voltage is 2.5 V±0.15 V, the normal output voltage range is from 1.55 to 4.45 V.

With such a configuration, it is not necessary for the controlled object such as an automobile to specifically determine whether a sense signal outputted from output terminal 18A of output circuit section 18 is one during normal condition or during abnormal condition. This can further reduce the possibility to erroneously use a sense signal under abnormal condition on the controlled object side, thus leading to further improvement in reliability.

Moreover, as shown in FIG. 4, with a configuration such that an output terminal with reference numeral 18A, from which the sense signals from first and second processing circuit sections 14A, 14B and the failure detection signals from failure diagnosis circuit 16 are outputted, is shared and the sense signals and the failure detection signals are digitally outputted by time division system, it is possible to reduce the number of output terminals, so as to realize reduction in size.

Further, as described in the first embodiment, with a configuration such that, as shown in FIG. 4, time point measuring unit 17 for measuring time point information and adding the time point information to an output from the failure diagnosis object section is provided, to make the failure detection signal and the sense signal correspond to each other by time point information, it is possible to seek further improvement in reliability.

In other words, with such a configuration, the failure detection signal and the sense signal can be made to correspond to each other in terms of time points by means of the time point information. Thus, when failure diagnosis circuit 16 determines abnormality at time point t04 shown in FIG. 3, the sense signal added with the time point information at time point t04 and made to correspond to the failure detection signal (f041 to f048) added with the time point information at time point t04 at which the abnormality occurs in terms of time points and the sense signal added with the time point information after time point t05 subsequent to time point t04 at which the abnormality occurs can be more accurately outputted as a signal of a value outside the normal output voltage range, thereby to seek further improvement in reliability from the time of occurrence of abnormality and continuously thereafter.

Moreover, in output circuit section 18, with a configuration such that the sense signal and the failure detection signal made to correspond to each other based upon the time point information are outputted as coupled with each other by the time division system, it is possible to omit processing of coupling the sense signal and the failure detection signal made to correspond to each other based upon the time point information on the controlled object side.

Furthermore, output circuit section 18 outputs the first and second sense signals, which are added with the time point information by time point measuring unit 17, after outputting the failure detection signal added with the time point information at the same time point as the relevant time point information. In other words, output circuit section 18 outputs the first and second sense signals and the failure detection signal made to correspond to each other based upon the time point information as coupled with each other by the time division system. Upon coupling, the coupling is carried out in such a manner that the failure detection signals (f11 to f18) at time point t01 shown in FIG. 3 are outputted before the sense signal at time point t01 shown in FIG. 2. Thus, before the sense signal under abnormal condition is outputted from output circuit section 18, the failure detection signal which is made to correspond to the sense signal using the time point information and which indicates that the sense signal is one during abnormal condition can be outputted. With the correspondence of the time point information, the failure detection signal can be reliably outputted before the sense signal even if some kind of delay occurs at one part of the circuit through which the failure detection signals (f11 to f18) pass. The sense signal under abnormal condition thus can be prevented from being used to control automobiles, and the like. The reliability further improves as a result.

In the second embodiment, the description is given using the two devices, angular velocity detection device 12A and acceleration detection device 12B, as detection device 12 and also using, as the circuit configuration corresponding thereto, the configuration having first and second drive circuit sections 11A, 11B, first and second detection circuit sections 13A, 13B, and first and second processing circuit sections 14A, 14B. However, one detection device 12 may be provided and as a circuit configuration corresponding thereto, only each one drive circuit section, detection circuit section, and processing circuit section may be provided.

Although detection device 12 is the constitutional requirement of the sensor apparatus in the second embodiment, the present invention can also be configured even with detection device 12 provided outside the sensor apparatus.

In the second embodiment, the example is described where first and second detection circuit sections 13A, 13B are set as the first and second failure diagnosis object sections, and the identical portions respectively in the angular velocity detection system and the acceleration detection system are set as the failure diagnosis object sections. However, it may be configured such that non-identical portions respectively in the angular velocity detection system and the acceleration detection system are set as the two failure diagnosis object sections, as in a case where first detection circuit section 13A is set as the first failure diagnosis object section and second processing circuit section 14B is set as the second failure diagnosis object section. In that case, it is necessary to add common first time point information to both an output concerning a sense signal from first detection circuit section 13A and an output concerning failure detection outputted by first detection circuit section 13A toward failure diagnosis circuit 16, while it is necessary to add common second time point information to both information on a sense signal from second processing circuit section 14B and information on failure detection outputted by second processing circuit section 14B toward failure diagnosis circuit 16.

Although one portion is set as the failure diagnosis object section in each of the angular velocity detection system and the acceleration detection system in the second embodiment, it may be configured such that failure diagnosis circuit 16 has a plurality of failure diagnosis object sections. Specifically, for example, failure diagnosis circuit 16 is electrically connected to each of first and second detection circuit sections 13A, 13B and first and second processing circuit sections 14A, 14B, and outputs failure detection signals of the respective sections. With such a configuration, a failure having been undetectable by one failure diagnosis object section can be detected by the plurality of failure diagnosis object sections performing failure diagnoses, so as to improve the accuracy of failure detection.

It is to be noted that, also in the example shown in FIG. 4, the failure diagnosis object section may set one portion as the failure diagnosis object section in each of the angular velocity detection system and the acceleration detection system, or it may be configured such that failure diagnosis circuit has a plurality of failure diagnosis object sections. With the configuration having the plurality of failure diagnosis object sections, a failure having been undetectable by one failure diagnosis object section can be detected by the plurality of failure diagnosis object sections performing failure diagnoses, so as to improve the accuracy of failure detection.

Although the description is given using angular velocity detection device 12A, acceleration detection device 12B and the like in the second embodiment, other than those, a variety of sensor apparatus such as a pressure sensor can also be implemented.

As described above, the sensor apparatus of the present invention has an effect of allowing improvement in reliability under abnormal condition, and is useful in automobiles, aircraft, vessels, robots, a variety of other electronic devices, and the like.

What is claimed is:

1. A sensor apparatus, comprising:
a drive circuit section for outputting a drive signal;
a detection device, into which the drive signal from the drive circuit section is inputted;
a detection circuit section for fetching a response signal from the detection device, and outputting the response signal;
a processing circuit section for fetching a sense signal from the response signal, and outputting the sense signal from a first output terminal;
a failure diagnosis circuit for setting as a failure diagnosis object section at least any one of the drive circuit section, the detection device, the detection circuit section and the processing circuit section, determining whether the failure diagnosis object section is normal or abnormal, and outputting a failure detection signal from a second output terminal in the case of determining abnormality; and
a time point measuring unit for measuring time point information, and adding the time point information to an output concerning generation of the failure detection signal outputted from the failure diagnosis object section and an output concerning generation of the sense signal outputted from the failure diagnosis object section, such that the output concerning generation of the failure detection signal is made to correspond to the output concerning generation of the sense signal using time point information in terms of time points, wherein, in the case of the failure diagnosis circuit determining abnormality of the failure diagnosis object section, the first output terminal outputs the sense signal added with the time point information at the time of occurrence of the abnormality and the sense signal added with the time point information after the time of occurrence of the abnormality, as a signal outside a range of a normal output voltage.

2. The sensor apparatus according to claim 1, wherein the first output terminal outputs the sense signal added with the time point information by the time point measuring unit after the second output terminal outputs the failure detection signal added with time point information at the same time point as the time point information.

3. A sensor apparatus, comprising:

a drive circuit section for outputting a drive signal;

a detection device, into which the drive signal from the drive circuit section is inputted;

a detection circuit section for fetching a response signal from the detection device, and outputting the response signal;

a processing circuit section for fetching a sense signal from the response signal, and outputting the sense signal;

a failure diagnosis circuit for setting as a failure diagnosis object section at least any one of the drive circuit section, the detection device, the detection circuit section and the processing circuit section, determining whether the failure diagnosis object section is normal or abnormal, and outputting a failure detection signal in the case of determining abnormality;

an output circuit section for outputting the sense signal from the processing circuit section and the failure detection signal from the failure diagnosis circuit by a time division system; and a time point measuring unit for measuring time point information, and adding the time point information to an output concerning generation of the failure detection signal outputted from the failure diagnosis object section and an output concerning generation of the sense signal outputted from the failure diagnosis object section, such that the output concerning generation of the failure detection signal is made to correspond to the output concerning generation of the sense signal using time point information in terms of time points, wherein, in the case of the failure diagnosis circuit determining abnormality of the failure diagnosis object section, the output circuit section outputs the sense signal added with the time point information at the time of occurrence of the abnormality and the sense signal added with the time point information after the time of occurrence of the abnormality, as a signal outside a range of a normal output voltage.

4. The sensor apparatus according to claim 3, wherein the output circuit section outputs the sense signal added with the time point information by the time point measuring unit after outputting the failure detection signal added with time point information at the same time point as the time point information.

\* \* \* \* \*